United States Patent [19]
Simon et al.

[11] Patent Number: 5,611,566
[45] Date of Patent: Mar. 18, 1997

[54] GAS GENERATOR FOR A SAFETY SYSTEM FOR PROTECTING OCCUPANTS IN MOTOR VEHICLES

[75] Inventors: Josef V. Simon, Olching; Thomas Liebl, Neubiberg; Hermann Bauer, Chieming; Ludwig Oswald, Scharnach b. Grafing; Robert Schmucker, Riemerling, all of Germany

[73] Assignee: Temic Bayern-Chemie Airbag GmbH, Aschau, Germany

[21] Appl. No.: 373,471

[22] Filed: Jan. 17, 1995

Related U.S. Application Data

[63] Continuation-in-part of Ser. No. 109,330, Aug. 19, 1993, abandoned.

[30] Foreign Application Priority Data

Aug. 20, 1992 [DE] Germany .......................... 42 27 547.4

[51] Int. Cl.⁶ .................................................. B60R 21/26
[52] U.S. Cl. ........................................... 280/736; 280/741
[58] Field of Search ................................ 280/736, 741, 280/742; 102/530, 531; 422/164

[56] References Cited

U.S. PATENT DOCUMENTS

| | | | |
|---|---|---|---|
| 4,902,036 | 2/1990 | Zander et al. | 280/736 |
| 5,000,479 | 3/1991 | Werner | 280/736 |

FOREIGN PATENT DOCUMENTS

| | | | |
|---|---|---|---|
| 0041369 | 5/1981 | European Pat. Off. | |
| 2625960 | 1/1989 | France | |
| 2330194C3 | 7/1978 | Germany | |
| 3832120C2 | 7/1991 | Germany | |
| 3942008 | 7/1991 | Germany | 280/736 |
| 4012893 | 10/1991 | Germany | 280/736 |

OTHER PUBLICATIONS

Author: Luigi Brambilla Title: Airbag and Belt Textbook in: Automobiltechnische Zeitschrift 84 Pretensioner Provide Increased Safety for Driver and Front Passenger.

*Primary Examiner*—Paul N. Dickson
*Attorney, Agent, or Firm*—McGlew & Tuttle

[57] ABSTRACT

Gas generator for a safety system for the protection of occupants of motor vehicles, with a tubular or cylindrical housing, wherein the gas-generating solid propellant is contained in a combustion chamber within which volume-equalizing structure is arranged, surrounding the propellant, both in the direction of flow—along the principal axis—and peripherally over the entire circumference.

16 Claims, 2 Drawing Sheets

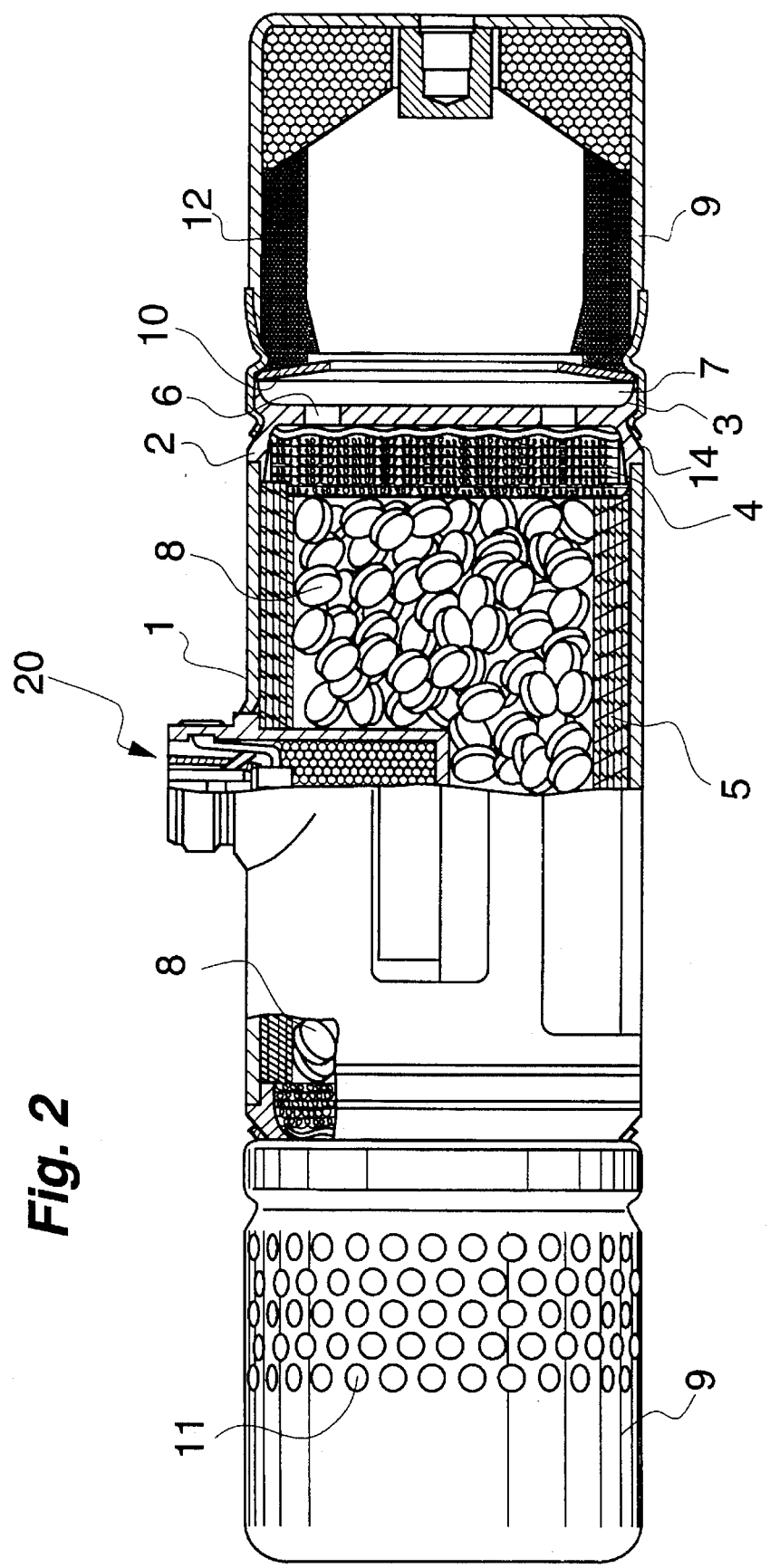

5,611,566

GAS GENERATOR FOR A SAFETY SYSTEM FOR PROTECTING OCCUPANTS IN MOTOR VEHICLES

This is a continuation-in-part of application Ser. No. 08/109,330 filed Aug. 19, 1993, now abandoned.

FIELD OF THE INVENTION

The present invention pertains to a gas generator for a safety system for the protection of occupants of motor vehicles including a tubular cylindrical housing for filling large volumes such as for filling the large volume of a passenger side airbag.

The principle of such a gas generator has been known from the *Automobiltechnische Zeitschrift*, Vol. 84 (1982), pp. 77–78.

BACKGROUND OF THE INVENTION

Prior-art gas generator systems for large filling volumes consist either of individual generators connected in parallel or of an individual gas generator of tubular shape.

The disadvantages of the individual gas generators connected in parallel are that they require two separate igniting units and are therefore subject to the related problems in terms of integration and reliability (wiring, plug-and-socket connections, signal control, etc.).

Besides the tubular gas generators with radial arrangement of the igniter, propellant, filter, and structure, generators with axial arrangement of the combustion chamber and filter have been known as well, as is described in German Offenlegungsschrift No. DE-OS 23 30 194 and in DE 38 32 120 C2.

Both variants represent an unfavorable solution to the new task in terms of the increasingly required reduction of structural mass (vibration behavior, etc.) and sound emission (during the actuation of the gas generator).

The arrangement and geometric shape of the individual components of the prior-art generators leads either to a high sound emission and/or—in the case of DE 38 32 120 C2—to high structural masses as a consequence of a lack of possibilities of saving material, e.g., of the combustion chamber tube to the nozzle bottom, connection of the filters in highly loaded structural areas, and unfavorable design of the gas routing, as well as filter configuration, with the consequence of high sound emission and undesired emission of solids.

Another essential disadvantage of the prior-art generators is the limited possibility of variation with various required amounts of propellant, which can be conducted in such devices only by individual adjustment of the combustion chamber lengths, and thus it leads to an unnecessary increase in cost.

SUMMARY AND OBJECTS OF THE INVENTION

It is an object of the invention to provide a gas generator for filling large filling volumes such as a passenger side airbag which avoids the problems of the prior art, particularly problems relating to gas generators with a tubular housing.

It is a further object of the invention to provide a high volume tubular gas generator which provides significant heat protection of the combustion chamber wall, which provides significant cooling of the gas as it passes from the combustion chamber to the airbag, which provides protection of the gas generating material during welding processes, which prevents movement and rattling of propellant tablets provided in the combustion chamber and which especially allows for different propellant masses using a single cylindrical housing structure.

A further object of the invention is to provide a combustion chamber lining designed such that a defined free space (free flow cross section) is provided in order to equalize a statically distributed discharge cross section determined by the loose propellant charge and thereby to reduce an existing dispersion in the pressure-versus-time curve.

According to the invention, a gas generator for safety systems for the protection of the occupants for motor vehicles is provided including a tubular or cylindrical housing. The gas generating solid propellant is contained in the combustion chamber formed by the tubular or cylindrical housing. In the combustion chamber there is also provided a volume-equalizing means arranged, surrounding the propellant, both in the direction of flow—along a principle axis of the tubular or cylindrical housing—and also peripherally over an entire circumference of the propellant contained in the combustion chamber.

A further object of the invention is to provide a gas generator for variable propellant masses including propellant masses for large filling volumes, which gas generator is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIG. 2 is a partially cross sectional view showing a preferred arrangement of the cylindrical part and connected outward chambers.

DETAILED DESCRIPTION OF THE PREFERRED EMBODIMENT

Figure 1:
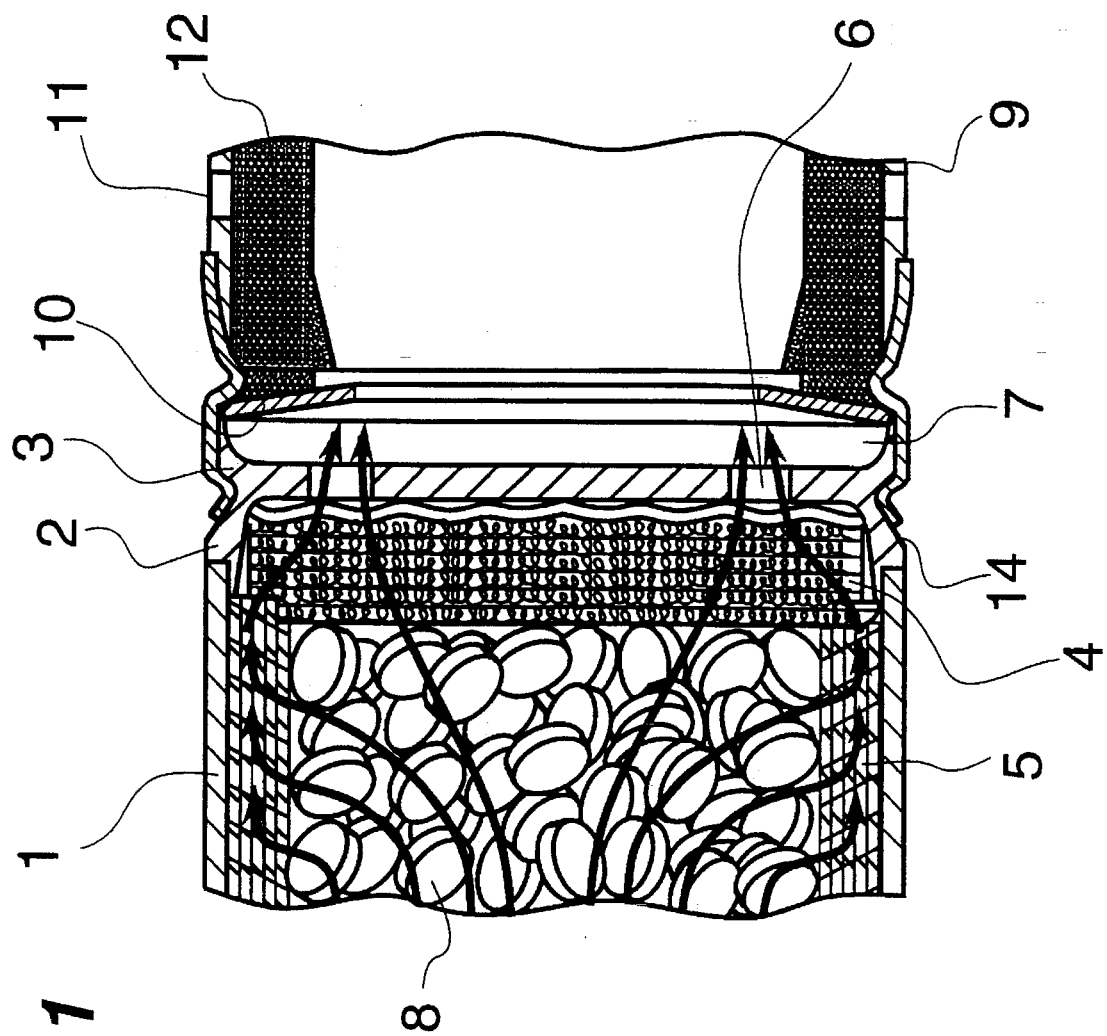
FIG. 1 is a cross sectional view showing the cylindrical part which defines the combustion chamber and an outwardly shaped spherical segment cap providing a connection to an outward chamber.

Referring to the drawing in particular, the invention comprises a cylindrical part 1, an open end and an opposite end. The open end is closed by an outwardly shaped spherical segment or cap 2 which engages the end surface of the open end of the cylindrical part 1. The cap 2 also preferably includes a flange portion 14 extending into and in contact with an inner surface of the cylindrical part 1. The flange portion 14 is formed as an extension of the cap 2. The cap 2 preferably has a different thickness and/or is formed of a different material as compared with the wall 1. Preferably, as shown in FIG. 1, flange 14 also has a different thickness from the wall 1 and is connected on the interior of wall 1 with the edge of wall 1 abutting a step shaped contour of the cap 2. The outwardly shaped spherical segment or cap 2 is provided with an outwardly directed apron 3 (integrally connected to cap 2 but outwardly directed with respect to the highly stressed combustion chamber area).

Within the highly stressed combustion chamber structure formed by the cylindrical part 1, there is provided one or more inserted end cap filler bodies 4. These equalize the empty volume in the combustion chamber and are formed with material to provide end holes/openings/gas passages of a size, number and distribution to assist in the desired throughput of combustion gases. The material used for filler body 4 may be a perforated plate, metal grating or grid, wire cloth, knit material (metallic), bedding layer or metal wool, metal felt, an arrangement of metal wires or combination of the aforementioned arrangements. This provides also a heat sink providing a desired precooling of the gas as noted below. The combustion chamber is provided with a further element to compensate for empty volume including a combustion chamber annular lining 5 providing a defined distance between the propellant and the combustion chamber wall. The lining 5 may similarly be formed of materials as noted above with regard to inserted filler bodies 4. This structure allows the flow of gases through the filler bodies (4 and 5) and has other desirable attributes as noted below with regard to positioning of the propellant tablets 8.

The outwardly shaped spherical segment or cap 2 is provided with preferably a plurality of combustion chamber discharge openings 6 leading outside the highly stressed combustion chamber area (in the direction of apron 3). The apron 3 cooperates with other structure to provide a large and dense slag deposit trap 7.

The arrangement allows for connection of the apron 3 to a filter or discharge housing 9 which may be connected about the apron 3 as shown in the figures. An annular disk 10 may be provided with a central opening which assists for trapping the large and dense slag deposit at the slag trap 7. The filter housing or discharge housing 9 is provided with a plurality of discharge openings 11 which direct the combustion gas to the airbag (not shown). A suitable lining 12 is provided about the inner periphery of the discharge housing 9 and may be formed of materials as noted with regard to lining 5 and filler bodies 4. The figures show a preferred arrangement including a lining provided immediately adjacent to the openings 11 and also provided for acting on the disk 10 as further layers of filter material provided inwardly of the openings 11 (see FIG. 1).

According to a preferred embodiment of the invention the filter chamber is connected so as to provide a symmetrical arrangement with outward filter housing or discharge housing 9 connected at each side of the cylindrical part 1. This arrangement is especially advantageous as forces generated upon gas generation are substantially cancelled due to the symmetrical arrangement. FIG. 2 also shows a standard ignition arrangement 20 positioned centrally in the cylindrical part 1.

The separation of the highly stressed combustion chamber structure into the cylindrical part 1 with the outwardly shaped spherical segment 2 for reduced-stress radial mounting and connection of the igniter tube, and into the combustion chamber bottoms with integrated mounting structure for the filters outside the areas of apron 3 loaded by internal pressure makes it possible to achieve an optimal material pairing in terms of stress between the cylinder tube and the nozzle bottoms.

In addition, as was mentioned above, the connection between the combustion chamber and the filter structure is made at the apron 3 connected integrally to the bottoms, i.e., it is located outside the highly stressed combustion chamber area, which in turn makes it possible to configure the design of the nozzle bottom, including the connection and joining process, according to the actual stress curves, taking into account the principle of light-weight construction, in a structurally optimized manner. Further, the connection of the end cap 2 with the flange extending into the interior in the region of the chamber lining 5 and filler body 4 provides structural integrity, particularly by providing the thickness of the end cap 2 to be larger than the wall 1 and even the thickness of the flange 14 is greater than the thickness of the wall 1. The structure of the end cap 2 with the apron 3 and flange 14 further provides the ability to position the end cap 2 spaced from the angular disk 10 while maintaining a sturdy construction.

The variation needed for different propellant masses is performed by means of one or more inserted filler bodies 4, which are used to equalize the actual empty volume in the combustion chamber, on the one hand, and bring about a desired precooling of the gas and consequently more favorable condensation conditions for the slag present in the gas flow, on the other hand, so that it is possible, in addition, to maintain one or more standardized combustion chamber lengths when different requirements are imposed in terms of performance, which leads to logistic and cost advantages.

Combined with the above-described filling bodies, the combustion chamber lining 5 is used, which serves the purpose of maintaining a defined distance between the propellant and the combustion chamber wall. The combustion chamber lining is designed such that a defined free space (free flow cross section) is guaranteed in order to equalize the statistically distributed discharge cross section determined by the loose propellant charge and thereby to reduce the existing dispersion in the pressure-versus-time curve. In addition, the following desired secondary effects arise:

Heat protection of the combustion chamber wall,

Cooling of the gas,

Protection against welding,

The propellant tablets are prevented from rattling.

Contrary to the prior-art filter structures, the configuration of the combustion chamber discharge openings 6, on which the present invention is based, is designed such that—due to the specified gas routing, on the one hand, and the discharge geometry (perforation pattern and position) of the filters, on the other hand—the best possible separation of slag (large and dense slag deposit trays 7) is achieved, while a low sound emission level is maintained.

While a specific embodiment of the invention has been shown and described in detail to illustrate the application of the principles of the invention, it will be understood that the invention may be embodied otherwise without departing from such principles.

What is claimed is:

1. Gas generator for a safety system for the protection of occupants of motor vehicles, comprising:

a cylindrical housing, defining a combustion chamber housing having one end and an opposite another end, said one end being an open end;

a cylindrical housing end cap for connection to said open end of said cylindrical housing, said end cap including an inwardly directed flange extending into said combustion chamber and an outwardly directed apron extending away from said combustion chamber, said end cap including combustion chamber discharge openings defining an axial direction of flow;

an igniter extending into said cylindrical housing to provide an igniter portion with an igniter discharge opening within said cylindrical housing, said igniter portion facing said combustion chamber discharge openings with said discharge openings being axially spaced from said igniter portion with respect to an axial direction of said cylindrical housing;

gas generating solid propellant positioned within said combustion chamber, said gas generating solid propelle to being provided in the form of a plurality of gas generating pellets; and volume-equalizing means including end cap volume-equalizing means for contacting said propellant in said axial flow direction—along a principle axis of said housing—and annular volume-equalizing means for coaxially surrounding said propellant around said axial flow direction and extending over an entire inner circumferential surface of said cylindrical housing between said igniter and said discharge openings, said annular volume equalizing means being provided between said cylindrical housing and said gas generating solid propellant to define an annular flow passage between said cylindrical housing and said gas generating solid propellant, said annular flow passage being substantially coaxial to said axial flow direction and extending to said end cap volume-equalizing means whereby flow from said annular flow passage passes through said end cap volume-equalizing means to said discharge openings;

said end cap comprising a shaped spherical segment defining flow direction means for directing combustion gas from said combustion chamber radially inwardly as combustion gas passes from said combustion chamber to a discharge chamber, said inwardly directed flange extending into said combustion chamber adjacent to said peripheral volume-equalizing means and adjacent to said end cap volume-equalizing means and said flange contacting inner surface of said cylindrical housing.

2. A gas generator according to claim 1, wherein:

said volume-equalizing means includes cooperating elements defining one of holes, openings and gas passages of a size and number for selecting each of distribution of combustion gas, a desired flow routing of combustion gas and a desired through put of combustion gas, said volume-equalizing means being positioned a predetermined distance from a wall essentially impermeable to gas.

3. A gas generator according to claim 2, wherein:

said volume-equalizing means is selected from the group consisting of a perforated plate, a metal grating, a metal grid, wire cloth, metallic knit material, a bedding layer, metal wool, metal felt, and an arrangement of metal wires.

4. A gas generator according to claim 1, wherein: said volume-equalizing means is selected from the group consisting of a perforated plate, a metal grating, a metal grid, wire cloth, metallic knit material, a bedding layer, metal wool, metal felt, and an arrangement of metal wires.

5. A gas generator according to claim 1, wherein, said discharge chamber engages said end cap, said end cap including a groove for positively locking said discharge chamber to said end cap.

6. Gas generator according to claim 5, further comprising a filter element positioned in said discharge chamber;

an annular disk cooperating with a wall of said discharge chamber to hold said filter element at a location spaced from said end cap.

7. A gas generator according to claim 1, wherein:

said annular volume-equalizing means filters and cools flow though said annular flow passage.

8. A gas generator according to claim 1, wherein:

said annular volume-equalizing means is positioned substantially parallel to a principal direction of flow of combustion gas to equalize a statically distributed discharge cross section determined by said pellets which define a loose propellant charge and to reduce an existing dispersion in the pressure-versus-time curve.

9. A gas generator for a safety system for the protection of occupants of motor vehicles, comprising:

a cylindrical housing having at least one open end, said cylindrical housing defining a combustion chamber;

an igniter extending into said combustion chamber;

a cylindrical housing end cap for connection to said open end of said cylindrical housing, said end cap including an inwardly directed flange extending into said combustion chamber and an outwardly directed apron extending away from said combustion chamber, said end cap including combustion chamber discharge openings defining an axial direction of flow, said igniter having an igniter portion with an igniter discharge opening within said cylindrical housing, said igniter portion facing said combustion chamber discharge openings with said discharge openings being axially spaced from said igniter portion with respect to an axial direction of said cylindrical housing;

gas generating solid propellant positioned in said combustion chamber, said gas generating solid propellent being provided in the form of a plurality of gas generating pellets;

volume-equalizing means including end cap volume-equalizing means for contacting said gas generating solid propellant between said propellant and said end cap for flow therethrough and annular volume-equalizing means for coaxially surrounding said gas generating solid propellant around said axial direction of flow and extending over an entire inner circumferential surface of said cylindrical housing from said igniter to said end cap, said annular volume-equalizing means being formed between said gas generating solid propellant and said cylindrical housing to define a annular flow passage between said cylindrical housing and said gas generating solid propellant, said annular flow passage being substantially coaxial to said axial direction of flow and extending to said end cap volume-equalizing means whereby flow from said annular flow passage passes through said end cap volume-equalizing means to said discharge openings.

10. A gas generator according to claim 9, further comprising:

a second cylindrical housing defining a discharge chamber, said second cylindrical housing including a closed end and opposite open end, said second cylindrical housing being connected to said apron at said second cylindrical housing open end, said second cylindrical housing having a plurality of openings for discharge of combustion gas therethrough.

11. A gas generator according to claim 10, wherein:

said end cap comprises an outwardly shaped spherical segment acting to direct combustion gas from said combustion chamber radially inwardly as combustion gas passes from said combustion chamber to said discharge chamber, said inwardly directed flange extending into said combustion chamber at a location adjacent to said annular volume-equalizing means, said flange having a surface positioned in contact with an inner surface of said cylindrical housing.

12. A gas generator according to claim 9, further comprising a discharge chamber, said discharge chamber engaging said end cap, said end cap including a groove for positively locking said discharge chamber to said end cap.

13. A gas generator according to claim 9, wherein:

said annular volume-equalizing means filters and cools flow though said annular flow passage; and said annular volume-equalizing means is positioned substantially parallel to a principal direction of flow of combustion gas to equalize a statically distributed discharge cross section determined by loose propellant charge and to reduce an existing dispersion in the pressure-versus-time curve.

14. A gas generator for a safety system for the protection of occupants of motor vehicles, comprising:

a cylindrical housing defining a combustion chamber, said cylindrical housing having a longitudinal axis and one open end positioned at one end of said cylindrical housing and another open end at another end of said cylindrical housing;

an igniter extending into said combustion chamber, between said open end and said another open end;

a first end cap connected to said one open end of said cylindrical housing, said end cap including combustion chamber discharge openings defining a direction of flow substantially parallel to said longitudinal axis, said igniter having an igniter portion with an igniter discharge opening within said cylindrical housing, said igniter portion facing said combustion chamber discharge openings with said discharge openings being axially spaced from said igniter portion with respect to an axial direction of said cylindrical housing;

another end cap connected to said another open end of said cylindrical housing, said another end cap including another end combustion chamber discharge openings defining a direction of flow substantially parallel to said longitudinal axis, said igniter having a second igniter portion with a second igniter discharge opening within said cylindrical housing, said second igniter portion facing said another end can combustion chamber discharge openings with said another end cap discharge openings being axially spaced from said second igniter portion with respect to an axial direction of said cylindrical housing;

gas generating solid propellant including loose propellant pellets positioned within said combustion chamber;

end cap volume-equalizing means positioned between said propellant and said first end cap and positioned between said propellant and said another end cap, said end cap volume-equalizing means contacting said propellant and compensating for empty space in said combustion chamber, said end cap volume-equalizing means also defining end passages for passage of combustion gases from said propellant through said end cap volume-equalizing means and to said discharge openings;

annular volume-equalizing means having an annular shape substantially coaxial with said longitudinal axis and formed substantially parallel to a principal direction of flow of combustion gas to equalize a statically distributed discharge cross section determined by said loose propellant pellets and to reduce an existing dispersion in the pressure-versus-time curve and positioned between said propellant and an inner circumferential surface of said cylindrical housing, said annular volume-equalizing means extending from said igniter to each end cap for contacting said propellant and also compensating for empty space in said combustion chamber, said annular volume-equalizing means also defining a longitudinal passage for passage of combustion gases from said propellant through said annular volume-equalizing means and to said end cap volume-equalizing means, said annular volume-equalizing means filtering and cooling flow through said annular flow passage.

15. Gas generator according to claim 14, wherein;

both of said end cap volume equalizing means and said annular volume equalizing means are selected from the group consisting of a screen plate, a metal net or grid, wire cloth, knitted fabric, swatches of metal wool, metal felt, an array of metal wires, or a combination of individual ones of the above group.

16. A gas generator according to claim 14, wherein:

said end cap volume equalizing means and said annular volume equalizing means are formed from one or more of the group consisting of a perforated plate, a metal grating, a metal grid, wire cloth, metallic knit material, a bedding layer, metal wool, metal felt, and an arrangement of metal wires.

* * * * *